United States Patent [19]
Meulnart

[11] 3,763,590
[45] Oct. 9, 1973

[54] REMOVABLE END-PIECE FOR FISHING FLOAT ASSEMBLY

[76] Inventor: André Meulnart, 37, avenue Paul Doumer, Paris, 16 eme, France

[22] Filed: Jan. 4, 1972

[21] Appl. No.: 215,366

[30] Foreign Application Priority Data
Jan. 11, 1971 France .............................. 7100606

[52] U.S. Cl................ 43/43.11, 43/44.88, 43/44.91
[51] Int. Cl............................................. A01k 93/00
[58] Field of Search........................ 43/43.11, 44.88, 43/44.91

[56] References Cited
UNITED STATES PATENTS

| | | | |
|---|---|---|---|
| 2,498,815 | 2/1950 | McVay | 43/43.11 |
| 2,778,147 | 1/1957 | Peck, Jr. | 43/44.91 |
| 2,825,175 | 3/1958 | Skvier | 43/44.91 |
| 3,020,670 | 2/1962 | Lockhart | 43/44.91 |
| 3,443,336 | 5/1969 | Reese | 43/44.88 |

*Primary Examiner*—Louis G. Mancene
*Assistant Examiner*—Daniel J. Leach
*Attorney*—Toren and McGeady

[57] ABSTRACT

In a separable end-piece for fixing a fishing line on a float assembly, the end-piece consisting of a body mounted on the float assembly, which forms an axial channel through which the fishing line passes, and a spool or element having a neck on which several turns of the line can be secured. The element is attached to the body by a flexible foot. The body forms a cavity into which the element, with the fishing line on it, is secured. The flexible connecting foot is of a sufficient length that it can occupy a transverse position above the blocking cavity so that its end supporting the spool can rest on the upper edge of the body of the end-piece with the spool positioned outside the body for winding the line on the neck of the spool.

8 Claims, 6 Drawing Figures

PATENTED OCT 9 1973 3,763,590
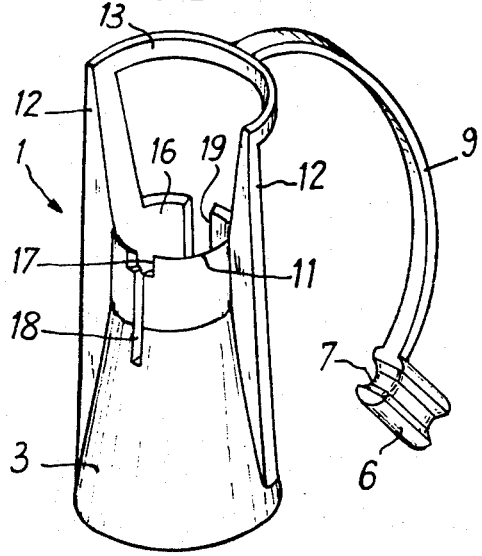
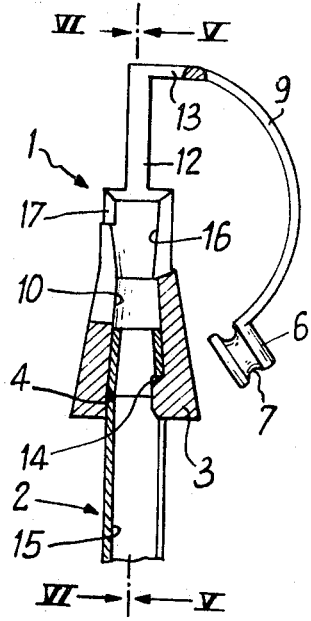
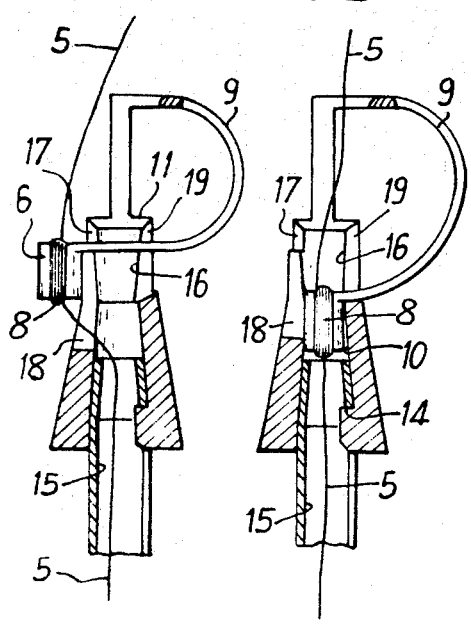
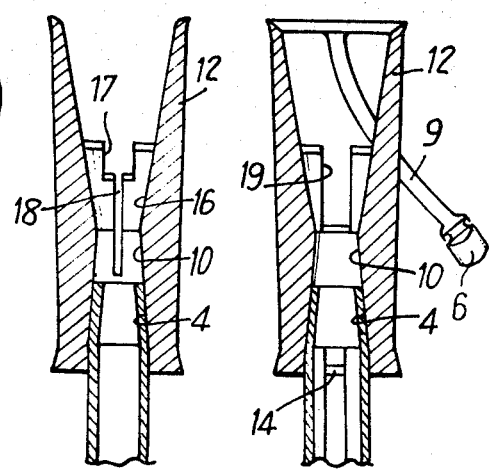

REMOVABLE END-PIECE FOR FISHING FLOAT ASSEMBLY

The invention relates to fishing float assemblies of the type which includes a separable end-piece for fixing the fishing line on the float.

The invention relates in particular to float assemblies for casting or ground-bait fishing which comprise two elements which slide in relation to one another. One of the elements forms a float proper while the other is intended to sink into the water and to be retained there by the float. Thse two elements form a housing between them which, when in the air, that is not in use, is normally closed so as to retain and protect the hook, the bait and eventually fish food particle and which when in the water opens so as to release the hook and the bait.

An end-piece, mounted on the upper part of one of the two elements, is arranged to block or secure the line in the direction of the descent of the hook and to permit, under certain conditions of tension exerted on the line above the end-piece, the liberation axially of the line in relation to the float so that it will slide, and of the subsequent recovery by winding of the entire length of the im-mersed line. For this purpose the end-piece includes a spool or element attached to the body of the end-piece by a flexible foot or the like, with a groove or neck on the spool on which the line can be wound by hand for a number of turns. To immobilize the line, the spool can be held fast in a blocking cavity formed in the end-piece with the cavity forming part of a channel through which the line passes. A downward tension on the line reinforces the blocking or holding effect within the cavity while a tension in the upward direction tends to displace the spool or element out of the cavity. After the spool is released from the cavity, the turns of the line wound on the blocking element unwind and the line is free to slide axially in relation to the whole of the float assembly including its end-piece.

One of the purposes of the invention is to arrange this end-piece so that the manual winding of the line on the spool or element and the introduction of this element into the cavity in the body of the float assembly are easily accomplished.

For this purpose, according to the invention, a separable end-piece is provided for fixing a fishing line on a float assembly. The end-piece comprises a body mounted on the float assembly and forming an axial channel for the passage of the line, and a spool or element having a neck on which a number of turns of the line can be wound. The element is attached to the body by a flexible foot. The body has a cavity intended to receive and secure the element. The invention is characterized by the fact that the flexible connecting foot is of such a length that it can occupy a position extending transversely above the blocking cavity so that its end which carries the line blocking element can rest on the upper edge of the body of the end-piece and the element can be placed outside the body for the winding of the line on its neck.

According to a preferred form of embodiment, the flexible foot is attached to the body above its upper edge, for example on two arms joined together at their upper ends by a curved element to which the foot is attached.

According to another characteristic, the blocking cavity is separated from the upper edge of the body by a guiding cavity having two diametrically opposite longitudinal notches in its side wall intended to receive together the foot during the line winding operation on the spool. One of the notches extends downwardly to the upper level of the blocking cavity, while the other notch is prolonged downwardly by a slit intended to receive the line beneath the element when it is in the winding position.

The invention will be understood with the help of the description which follows, relating to a preferred embodiment of the invention and referring to the attached drawing in which :

FIG. 1 is a perspective view of the end-piece according to the invention,

FIGS. 2 to 4 are partial longitudinal sections of the end-piece of FIG. 1, mounted on a float assembly and shown in three conditions or positions FIG. 5 is a section along the line V—V of FIG. 2, and FIG. 6 is a section along the line VI—VI of FIG. 2.

The end-piece 1 of the invention is intended to be mounted on the upper part of a float assembly represented partially by a rod 2. This float assembly may, for example, comprise two elements which between them form a housing for the reception of the hook bait and fish food particles, with the housing being open or closed according to the relative positions of the two elements of the float assembly.

The end-piece of the invention is intended to block the downward movement of the line under certain conditions and also, under certain conditions, to make it possible to release the line so that it can slide upwards for the purpose of the recovery of the line, generally by winding on the reel of a fishing rod.

The end-piece of the invention consists of a body 3, forming an axial channel 4 for the passage of a line 5 through the body. A blocking spool or element 6 is attached to the body 3 by a flexible foot and has a neck 7 on which a few turns 8 of the line 5 can be wound. A cavity 10 within the body is intended to receive and block or secure the element or spool 6 and above the cavity 10 and the body has an upper edge 11 on which one end of the foot 9 may rest (FIG. 3), when the spool 6 is located outside the body so that the line can be wound on the neck 7. The neck 7 is arranged in such a way that its axis is parallel to the nearby terminal part of the foot 9.

In the embodiment shown in the drawing, the foot 9 is fixed to the extreme upper part of the body 3 by means of upwardly extending arms 12 which are joined together at their upper ends by an arcuate part 13, which has the shape of a part of a ring. The foot 9 is attached to the part 13 intermediate its ends. This foot is advantageously formed, as the other parts of the end-piece, by injection moulding or moulding and has a certain flexibility which, as will be seen later on, favours the use of the end-piece. However, the foot can also consist of a simple wire or an imputrescible cord.

As shown in FIGS. 2 to 6, the rod 2 of the float assembly penetrates by its upper end into the channel 4 of the end-piece, where it is blocked or held by a locking device 14. The rod 2 in turn has an axial channel 15, opening towards the side, for the passage of the line.

The cavity 10 and the channel 4 arranged inside the body 3 form part of the same surface. In the drawing, this surface is conically shaped and flares out toward the bottom of the body. If desired at least the cavity 10 could be cylindrical. In both cases, the mean dia-meter of the cavity 10 is selected according to that of the spool 6 so that the cavity 10 can receive the empty spool 6 with only very little play or with no play at all, while — when a sufficient number of turns of the line 5 has been wound on the neck 7 of the spool — the outer turns project from the periphery of the spool (FIGS. 3 and 4), the spool thus wound cannot enter the cavity 10 without being forced into it and therefore cannot leave it except by means of a relatively strong action.

Preferably, the blocking cavity 10 is below a guiding cavity 16 which opens upwardly and facilities the introduction of the spool into the body. This cavity is, for example, frusto-conical and its lower diameter is the same as the upper diameter of the cavity 10, so that there is no projecting or abutment part between the cavities 10 and 16 which would impede the movement of the spool.

The cavity 16 is limited at the top by the edge 11 which is intended to support the foot 9 during the winding of the line 5 on the spool 6. In point of fact, in the form of embodiment shown in the drawing, the foot 9 does not rest directly on the edge 11, but in the bottom of a shallow notch 17 having a width at least equal to that of the foot 9. This notch is made through and extends downwardly from the portion of the edge 11 opposite to the half-ring part 13 with respect to the plane defined by the arms 12. In other words, the notch 17 is situated, in relation to the axis of the end-piece, on the side opposite to that on which the foot laterally projects from the body. Preferably, a slit 18 extends downwardly from the notch 17 and the slit is narrower than the notch and is intended to receive the line 5 either freely or without clearance when the line is wound on the spool (FIG. 3). This slit 18 may extend downwardly by a considerable distance into the body or even below the level of the blocking cavity 10.

On the other side of the edge 11 from the notch 17 there is provided another notch 19 of the same length as the notch 17 along the edge 11, but extending downwardly to the upper level or the cavity 10. This notch 19 is intended to receive the foot 9 both for the winding of the line on the spool (FIG. 3) when the foot extends transversely above the cavity 10 and for the blocking of the element 6 in the cavity 10 (FIG. 4).

The end-piece, according to the invention, has on either side of the plane defined by the arms 12 two lateral openings which widely clear the cavity 10 and therefore the cavity 16. In this way access to the cavity 10 and the manipulation of the spool 6 are easy.

The use of the float assembly comprising the end-piece 1 according to the invention is as follows : The end-piece is first of all pushed onto the rod 2 (FIGS. 2, 5 and 6), with the spool 6 and the foot 9 located for example, on the outside of the body. The user passes the line 5 freely into the cavity 16, the cavity 10 and the channel 15 of the rod 2, and then deflects the line into the slit 18, through which the line extends laterally from the end-piece.

The spool 6 is passed between the arms 12 and above the edge 11 into a portion outside the end-piece (FIG. 3) on the other side in relation to its initial position (FIG. 2). The foot 9 is guided into the notch 17 where it is received and is maintained elastically in position because of its flexibility. In this position the foot 9 also passes through the notch 19. The pool 6 thus extends outwardly of the end-piece and is retained laterally and downwardly by the notch walls and also abuts against the body 3, and it is maintained in position by the elastic restoring action of the foot 9. The user grips with one hand the part of the line which is located above the spool and easily winds the line about the neck 7 so as to form a number of turns 8, for example four or five, so that the turns form a pad or rim which projects outwardly from the contour of the spool. During this operation the line 5 which is located in the rod 2 may or may not be retained according to whether the winding is carried out with or without tension.

The spool which has been loaded in this way is then moved up over the edge 11 inwardly into the cavity 16. This operation is effected by acting on the foot 9, on the side of its point of attachment, and/or on the spool, the line being retained on the spool by hand so that it does not become unwound. During this transfer the line freely leaves the slit 18 and moves back into the body or else forms an external loop if it is retained by the slit. The spool is forced downwardly into the cavity 10 by manual tension on the line portion situated below the end-piece, for example on the line portion projecting below the float assembly. This force may be aided by pushing downwardly on the spool, although this is not absolutely necessary. For the pushed-in position shown in FIG. 4, the foot 9 is at or near the bottom of the notch 19 and this blocking position is limited either by the axial abutment of the spool on the rod 2 or by the fact that the foot abuts on the bottom of the notch 19.

The turns of the line 5 project beyond the contour of the spool and are therefore forced between the neck 7 and the wall of the cavity 10. This gripping action has the double purpose of ensuring the holding of the spool 6 within the cavity 10 and preventing the sliding of the line on the neck.

For the type of float assembly indicated above, the line 5 is wound under tension on a groove or neck of the spool or element of this float assembly and is blocked or held in position so that a strong tension exerted on the upper part of the line 5, for example from the rod, particularly during casting, cannot cause the spool or element 6 to come out of the cavity. Once it is in the water, the float assembly releases the lower part of the line and the line is axially retained only by the turns on the element 6 secured within the cavity 10. The resistance of this element to displacement from the cavity 10 is sufficient to overcome the tractive efforts in relation to the float assembly or jerks upwards which are normal during fishing. When lifting in the line, the float assembly and the element 6 still held in the cavity are withdrawn from the water until the end-piece comes into abutment against the ring at the top of the fishing-rod. An additional tension exerted on the line releases the element 6 from the cavity because the end-piece is abutting on the fishing-rod. The element 6 is pulled towards the fishing-rod until the set of turns is sufficiently inclined for the line to unwind.

This unwinding takes place practically after the element 6 has come out of the second cavity 16. Once the spool or element 6 has been freed from the line, the line slides freely in the float assembly for its almost complete recovery by winding, while the element 6, as a result of the action of the elastic foot 9, falls back either into the cavity 16 or into the position shown in FIG. 3.

As will be seen from the foregoing, the invention provides an end-piece which is easy to use, taking into account its small size, essentially because the edge of the cavity is clear.

The end-piece according to the invention may be made, for example, in a single piece by injection moulding, including the foot and the spool.

The invention is not restricted to the embodiment which has just been described ; on the contrary, one could conceive different modifications without thereby departing from the scope of the invention. In this way, the foot 9, instead of being connected to the body of the end-piece above the edge 11, could be connected below it, thus leading directly to the body.

I claim:

1. Separable end-piece for fixing a fishing line on a float assembly, said end-piece comprising a body arranged to be mounted on the float assembly, said body forming an axially extending channel therein for the passage therethrough of the fishing line, said body having an upper edge at one end of said channel, an element having a neck thereon, on which several turns of the line can be wound for securing the line, a flexible foot secured at one end to said element and at its other end to said body, said body forming a first cavity within its channel arranged to receive and to hold said line-securing element, wherein the improvement comprises that said flexible connecting foot is of such a length that it can occupy a transverse position across the upper edge of said body above said first cavity, so that its end which carries said line-blocking element can rest on the upper edge of said body of said end-piece and said line-securing element can be positioned outside said body for winding the line on the neck of said element.

2. End-piece, as set forth in claim 1, wherein said flexible foot is attached to said body at a location spaced from said upper edge and on the opposite side of said upper edge from said first cavity.

3. End-piece, as set forth in claim 2, wherein said body comprises two spaced arms secured to and extending axially from said upper edge of said body in the direction away from said first cavity and a part forming a portion of a ring secured to and extending between the ends of said arms spaced from said upper edge, and said lexible foot is attached to said part.

4. End-piece, as set forth in claim 1, wherein said body has a first notch formed therein extending axially from said upper edge and said first notch is arranged to receive said flexible foot for winding the line on such securing element, and said flexible foot is secured to said body so that it extends therefrom on the opposite side of the axis of said body from said first notch.

5. End-piece, as set forth in claim 4, wherein said body has a slit formed therein extending in the axial direction of said channel from the base of said first notch so that the line wound on such securing element can extend through said slit into such channel in said body.

6. End-piece, as set forth in claim 4, wherein said body forms a second cavity within its channel between said first cavity and the upper edge of said body, said body having a second notch formed in the upper edge thereof and extending from said upper edge to the adjacent end of said first cavity, said second notch is arranged to hold said flexible foot during the winding operation of the line on said securing element and said flexible foot bears against the base of said second notch when said securing element is held within said first cavity.

7. End-piece, as set forth in claim 6, wherein said second cavity extends from said upper edge of said body to said first cavity and said first and second notches are located on the opposite sides of said upper edge.

8. End-piece, as set forth in claim 1, wherein said flexible foot and said securing element are formed integrally with said body.

* * * * *